(12) United States Patent
Dickinson et al.

(10) Patent No.: US 9,499,108 B2
(45) Date of Patent: Nov. 22, 2016

(54) MAGNETIC FASTENER CLIP

(71) Applicant: Termax Corporation, Lake Zurich, IL (US)

(72) Inventors: Daniel James Dickinson, Lincolnshire, IL (US); Michael Walter Smith, Palatine, IL (US); John Clasen, Crystal Lake, IL (US); Michael Tirrell, Volo, IL (US)

(73) Assignee: TERMAX CORPORATION, Lake Zurich, IL (US)

( * ) Notice: Subject to any disclaimer, the term of this patent is extended or adjusted under 35 U.S.C. 154(b) by 0 days.

(21) Appl. No.: 14/622,893

(22) Filed: Feb. 15, 2015

(65) Prior Publication Data

US 2015/0283957 A1 Oct. 8, 2015

Related U.S. Application Data

(63) Continuation-in-part of application No. 13/831,525, filed on Mar. 14, 2013.

(51) Int. Cl.
*B60R 13/02* (2006.01)
*F16B 5/12* (2006.01)
*F16B 1/00* (2006.01)

(52) U.S. Cl.
CPC ........... *B60R 13/0206* (2013.01); *F16B 5/123* (2013.01); *F16B 2001/0035* (2013.01); *Y10T 24/32* (2015.01); *Y10T 29/49959* (2015.01)

(58) Field of Classification Search
CPC .......... B60R 13/0206; B60R 13/0275; B60R 13/0218; B60R 13/02; F16B 1/00; F16B 2001/0035; B62D 65/14; B62D 25/06; A44D 2203/00; A41F 1/002; A45C 13/1069

USPC ................. 248/206.5, 224.8, 225.11; 24/303
See application file for complete search history.

(56) References Cited

U.S. PATENT DOCUMENTS

| | | |
|---|---|---|
| 1,523,042 A | 6/1925 | Thomas |
| 2,940,361 A | 6/1960 | Francisco |
| 3,025,559 A | 3/1962 | Basinger |
| 3,244,443 A | 4/1966 | Rodgers |
| 3,261,631 A | 7/1966 | Alessi |
| 3,300,239 A | 1/1967 | Dinkin |
| 3,330,066 A | 7/1967 | Crawford |
| 3,781,047 A | 12/1973 | Surko, Jr. |

(Continued)

FOREIGN PATENT DOCUMENTS

| | | |
|---|---|---|
| GB | 1056797 | 1/1967 |
| JP | 53-4919 | 1/1978 |

(Continued)

*Primary Examiner* — Anita M King

(57) ABSTRACT

A magnetic fastener clip includes a cup having at least one injection hole, an overmold attached to the cup and a magnet is attached to the overmold. The overmold has: a cup cover attached to an outside portion of the cup, and an inner ring attached to an inside portion of the cup. The inner ring is attached to the cup cover via the at least one injection hole. The magnet operably attaches into the inner ring. According to one embodiment, the cup cover and the inner ring are injection molded over at least one part of the cup. An optional coupler for attachment to a body panel is attached to the cup cover and is operative to flex. The magnetic fastener clip adapts to different surface curvatures and thicknesses. The magnetic fastener clip is operative for blind attachment into a structure, such as a vehicle chassis.

18 Claims, 5 Drawing Sheets

(56) References Cited

U.S. PATENT DOCUMENTS

| | | |
|---|---|---|
| 4,303,054 A | 12/1981 | Lore |
| 4,825,526 A | 5/1989 | Shenier et al. |
| 4,907,769 A | 3/1990 | Hunley, Jr. et al. |
| 5,042,867 A | 8/1991 | Crotty et al. |
| 5,078,281 A | 1/1992 | Johnson |
| 5,082,317 A | 1/1992 | Delaney, Jr. |
| 5,187,744 A | 2/1993 | Richter |
| 5,280,991 A | 1/1994 | Weiland |
| 5,385,161 A | 1/1995 | Loker |
| 5,687,945 A | 11/1997 | Lee |
| 5,983,464 A | 11/1999 | Bauer |
| 6,295,702 B1 * | 10/2001 | Bauer ............... A45C 13/1069 24/303 |
| 6,564,434 B1 * | 5/2003 | Morita ............... A45C 13/1069 24/114.2 |
| 6,857,809 B2 | 2/2005 | Granata |
| 6,895,642 B2 * | 5/2005 | Huang ............... A47G 1/17 24/303 |
| 7,217,059 B1 | 5/2007 | Rudduck |
| 7,241,069 B2 | 7/2007 | Richter |
| 7,306,190 B2 | 12/2007 | Tisol, Jr. |
| 7,435,031 B2 | 10/2008 | Granata |
| 8,360,488 B2 * | 1/2013 | Forrest ............... E05B 1/0015 292/251.5 |
| 8,555,468 B2 * | 10/2013 | Moerke ............... B60R 13/0206 24/293 |
| 8,615,852 B2 * | 12/2013 | Smith ............... B60R 13/0206 24/114.2 |
| 2004/0258471 A1 | 12/2004 | Granata |
| 2005/0045784 A1 * | 3/2005 | Pitlor ............... H02G 3/20 248/206.5 |
| 2006/0127172 A1 | 6/2006 | Tisol, Jr. |
| 2009/0250948 A1 * | 10/2009 | Forrest ............... E05B 1/0015 292/251.5 |

FOREIGN PATENT DOCUMENTS

| | | |
|---|---|---|
| JP | 59-145860 | 8/1984 |
| JP | 62-152945 | 7/1987 |
| JP | 6-6116 | 1/1994 |
| JP | 06-228507 | 8/1994 |
| JP | 08-132981 | 5/1996 |
| JP | 09-264306 | 10/1997 |
| JP | 10-131926 | 5/1998 |
| JP | 11-178172 | 7/1999 |
| JP | 2002-059793 | 2/2002 |

* cited by examiner

MAGNETIC FASTENER CLIP

RELATED APPLICATIONS

This is a continuation in part application claiming priority from an application entitled "Magnetic Fastener Clip" having a Ser. No. 13/831,525, and having a filing date of Sep. 25, 2014, which is a continuation in part application claiming priority from an application entitled "Magnetic Fastener Clip" issued as U.S. Pat. No. 8,615,852, and having a filing date of May 13, 2009, the entire disclosure of which is incorporated herein by reference.

FIELD OF THE INVENTION

The invention relates generally to devices for fastening objects, and more particularly to a magnetic fastener clip for insertion into an engagement structure, such as a vehicle chassis, a hollow substrate, a wall, a plate or any suitable surface.

BACKGROUND OF THE INVENTION

A number of devices and fasteners are currently available for fastening panels such as body panels and automobile interior trimpiece panels to the chassis of a vehicle. Fastener clips are used in automobile assemblies to secure body panels such as pillar covers, headliners, interior panels and the like to chassis structures such as roofs, door structures and body pillars. As used herein, a body panel refers to, for example, any interior or exterior structure attached to a vehicle, such as a plastic or metal interior trim piece or any interior trimpiece. The body panel may be any suitable exterior body panel, such as a fender, bumper, quarter panel or door panel. The chassis of the vehicle may include any substrate, plate, metal support, sheet metal, fiberglass, carbon fiber, body panel, structural framework, chassis component or subcomponent, support component, wall or any suitable object or combination.

Interior automobile fasteners, such as screws, are known to retain a body panel to a vehicle chassis. For example, a screw may attach a headliner in position within the automobile roof. However, many of these fasteners may only fasten around the periphery of a headliner. While a dome light or the like may be located in the middle of the roof area, extensive expanses of the headliner are not supported or fastened by such structures. However if the middle of a body panel is attached by a fastener, then the periphery are not supported. As a result, these fasteners allow the body panel such as the headliner to sag, providing an aesthetically unacceptable appearance.

Attaching the headliner to the interior of the roof typically requires securing clips already fastened to a headliner assembly into a hole, slot or mounting point on the roof. At least some of the clips require blind insertion and installation of the fasteners because the installer is not able to view the fastener clip or the mounting point on the roof.

Fastener clips are also known for attaching body panels to an automobile chassis. Magnets may be used to reduce the problem of the blind fastener application. Thus, magnetic fastening clips do not require as much alignment between a fastener and a mating hole and attachment of the fastener to the hole. For example, fastener clips are known that attach to an automobile headliner or the like using adhesive, and which connects to a magnet.

Another known clip has a base, a dome spaced from the base and a plurality of supports between the base and the dome. A hollow post extends outwardly from the dome and includes at least one deflectable portion having an outward protuberance thereon. A pin is substantially aligned with the post and connected thereto by at least one frangible link. A frangible link between the pin and the clip is adapted to rupture when the pin is driven. However, since the pin requires alignment and insertion during manufacture, assembly is time consuming labor intensive and expensive. Further, the assembly of the magnet to the fastener typically requires a hole drilled into the magnet in order to attach the magnet to the fastener via a pin, screw or other fastener to go through the hole. The hole reduces the amount of magnetic flux and thus reduces the magnetic strength, requires additional processing steps and increases costs.

These known clips however are neither sufficiently rugged nor flexible for example on an automobile assembly line that can be somewhat harsh. These fastening clips typically do not have a long useful life to support the headliner and prevent staking throughout the anticipated life expectancy of the vehicle. During installation the headliner can be moved, stretched or twisted inconsistently. Also, these fastening clips have a fixed engagement length between the chassis and body panel.

However, the fastener device is typically required to secure the panel to the chassis that may have sheet metal with different amounts of curvature or thicknesses throughout. If the sheet metal varies in curvature or thickness or if for example, tolerances in production of the vehicle chassis or in the trim-piece, i.e. headliner exist, then engagement of one fastener to the roof may not provide suitable magnetic engagement or will otherwise result in movement. Further, less than all these fasteners typically make engagement with the chassis. Twisting of the body panel will be likely more prevalent because less than all contact points are actually made with the roof. As a result, sagging, wear, squeaks, rattles, buzzing, corrosion and loss of elasticity and loss of sealing may result, especially after years of vehicle operation and exposure to vibration and other environmental conditions. As such, these fastener clips do not provide sufficient flexibility nor suitable magnetic engagement.

Once installed, during use of the automobile, the headliner is sometimes contacted or pushed by passengers. The fastener device typically secures the headliner under a variety of environmental conditions, such as in the presence of vibration at various levels of amplitude and frequency. Further, the fastener device should prevent or minimize the amount of buzzing, rattling or any other type of noise that may cause attention to the occupants of the vehicle or otherwise weaken the attachment. Further yet, fasteners seek the conflicting goal of securing a body panel to the chassis while accommodating various levels of sheet metal curvature, thicknesses, and production tolerances. For example tolerances, such as various dimensions amongst the body panels as well as the vehicle chassis may be accommodated. Conventional fastener devices typically do not adequately fasten to a range of sheet metal thicknesses and do not minimize or eliminate buzzing and rattling and do not sufficiently accommodate variations in production tolerances. As a result, these clips do not properly fasten the body panel to the chassis. If the fastener clip is broken after installation of the body panel, sagging can occur again presenting the aesthetically undesirable appearance. Further, replacement of an installed, broken clip can be difficult.

DETAILED DESCRIPTION OF THE PREFERRED EMBODIMENTS

Figure 1:
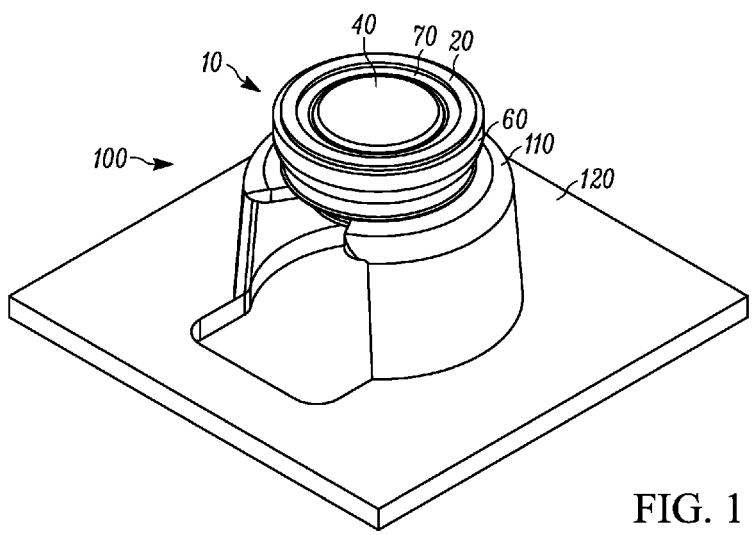
FIG. 1 is a view of a magnetic fastener clip and body panel assembly according to one embodiment.

A magnetic fastener clip includes a cup having at least one injection hole, an overmold attached to the cup and a magnet is attached to the overmold. The overmold has: a cup cover attached to an outside portion of the cup, and an inner ring attached to an inside portion of the cup. The inner ring is attached to the cup cover via the at least one injection hole. The magnet operably attaches into the inner ring. According to one embodiment, the cup cover and the inner ring are injection molded over at least one part of the cup. An optional coupler for attachment to a body panel is attached to the cup cover and is operative to flex. The magnetic fastener clip adapts to different surface curvatures and thicknesses. The magnetic fastener clip is operative for blind attachment into a structure, such as a vehicle chassis i.e. a pillar, door frame, chassis or roof.

Among other advantages, the magnet does not require a hole in the magnet to attach to the cup. Since the magnet is not drilled to create a hole, the magnet does not suffer from a reduction of magnetic flux. Thus, the magnet retains the high level of magnetic flux and thus the magnetic force is maximized. Also, since the steps of drilling the magnet hole and fastening via the magnet hole is not required, the magnetic fastener is manufactured in fewer steps and in much less time that prior art devices. Attachment of the magnet to the cup is significantly reduced, cost is reduced and manufacturing time is reduced.

Another significant advantage is that the magnetic fastener clip including the cup may be manufactured with few stamping and overmolding steps. According to one embodiment, the cup is stamped in one or a few number of pressing steps. For example, the cup may be made without expensive milling, cutting or drilling and is thus ready for overmolding directly after stamping. According to one embodiment, the cup may be made with a single stamping step. Additionally, a recess may be stamped around the ring of the cup to permit and accommodate a burr to form due to stamping. The recess accommodates the formation of the burr during stamping and thus does not interfere with the cup edge. As a result, the cup edge remains uniform and evenly engages the chassis plane. The recess avoids the need for filing the burr.

According to yet another advantage, the overmold step directly forms the cup cover and the inner rings in one injection process. The magnetic fastener is relatively easy to manufacture using relatively inexpensive manufacturing processes and materials, especially compared to known manufacturing processes. The use of the magnetic fastener clip decreases production costs, increases worker productivity and efficiency, improves reliability and quality and decreases overall vehicle assembly, warranty and maintenance costs.

The optional coupler is operative to flex or compress according to an appropriate curvature. As the coupler flexes, the magnetic fastener may pivot about the coupler boss for example at an angle to allow the magnetic fastener to adapt to different surface curvatures while securely fastened to the body panel. Thus, the coupler and/or boss structure adapts to different attachment lengths, variations of sheet metal roundness and thicknesses thus allowing the magnet fastener to adjust to different depths while pivoting and maintaining a high level of extraction force. During installation, the magnet continuously adapts to variations in curvature and dimensions of the vehicle roof and/or in the body or headliner panel. Thus, only a single magnetic fastener clip need be used with a vehicle or application even if different attachment points and cup tilt is required or even if the curvature or thickness of the sheet metal varies substantially.

Yet another advantage of the magnet, along with an optional coupler, permits relatively easy insertion of the magnetic fastener clip into a vehicle chassis, pillar, instrument panel structure, door, roof or suitable body panel while providing a relatively high level of extraction force from the body panel. Assembly of the body panel onto the vehicle chassis is very easy and requires no or a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for blindly inserting the body panel into the vehicle chassis may result in fewer injuries to the assembly workers, including injuries related to repetitive stress syndrome. Further by selecting a single fastener or reducing the number of different fasteners for different sheet metal curvatures and thicknesses, confusion during assembly is eliminated since the same type or a reduced number of fasteners may be used for all or most body panel fasteners. Thus, an assembly worker need not worry about selecting the wrong fastener.

The magnetic fastener clip relatively easily facilitates attachment of a body panel with the structure, such as the vehicle door frame, chassis, instrument panel structure, pillar or roof, such that a single adjustable magnetic fastener clip may be used with different depth attachment requirements, sheet metal curvatures and/or thicknesses. For example, a vehicle door, pillar, instrument panel structure, chassis, or roof may have different sheet metal curvatures, different fastener tilt requirements and attachment points at various parts of the vehicle. The body panel may be an automobile headliner, door panel, instrument panel, an A, B, C, D, etc. pillar panel, bumper, fender, quarter panel, grill, hood, roof, trunk panel or any suitable interior or exterior panel.

The relatively high level of extraction force, characteristic of the magnetic fastener clip, securely attaches the body panel, such as a door panel, or headliner, to the vehicle chassis. Further, the fastener clip continuously adapts to changes in environmental conditions such as vehicle flexing, pushing by passengers, vibration and thermal expansion. For example, the magnetic fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip may be made of anti-corrosive material such as plastic or treated metal to provide long reliable service life.

The magnetic fastener clip securely attaches a body panel such as a door panel to a door frame, or headliner to the vehicle roof, such that the magnetic fastener clip installs easily, fastens securely, improves reliability both in the short term and in the long term, while further improving vehicle safety and quality.

Figure 2:
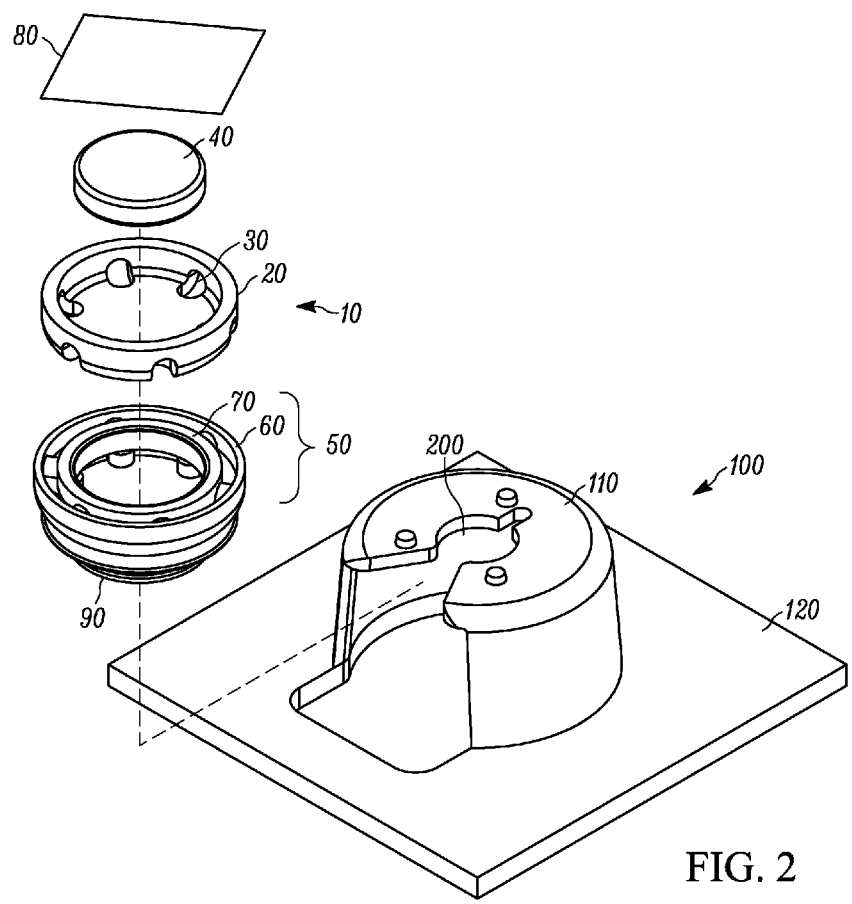
FIG. 2 is an exploded view of a magnetic fastener clip and body panel assembly according to another embodiment.
Figure 3:
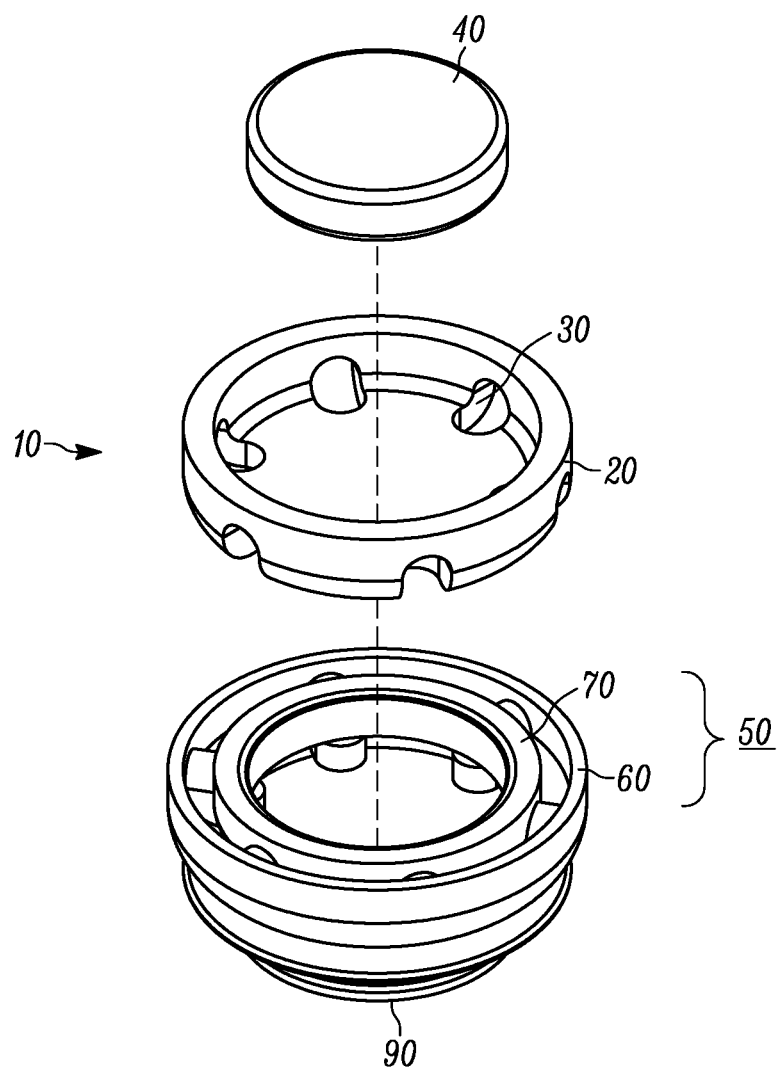
FIG. 3 is an exploded view of a magnetic fastener clip according to another embodiment.
Figure 4:
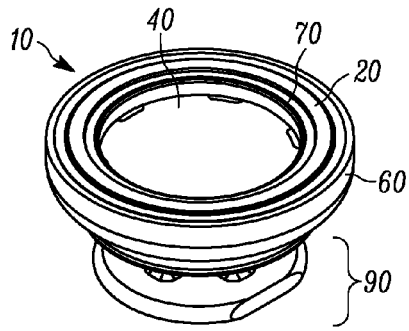
FIG. 4 is a perspective view of the magnetic fastener clip according to one embodiment.

FIGS. 1, 2 and 3 are perspective views of a magnetic fastener clip 10 according to an embodiment. The magnetic fastener clip 10 includes a cup 20 having at least one hole 30, a magnet 40, and an overmold 50 attached to the cup 20. The overmold 50 has: a cup cover 60 attached to an outside portion of the cup 20, and an inner ring 70 attached to an inside portion of the cup 20. The inner ring 70 is attached to the cup cover 60 via the at least one hole 30. The magnet 40 operably attaches into the inner ring 70, such as via a press fit. According to one embodiment, the cup cover 60 and the inner ring 70 are injection molded over at least one part of the cup 20 to form the cup cover 60 and the inner ring 70. The magnetic fastener clip 10 is operative for blind attachment into a structure 80, such as a vehicle chassis i.e. door frame, chassis or roof.

As shown in FIGS. 4-7, an optional coupler 90 is attached to the cup cover 60 and is operative to flex. For example, cup cover 60 may be or may include an optional coupler 90 suitable to engage a mounting structure 100 (shown in FIGS. 1 and 2). The coupler 90 of the magnetic fastener 10 clip adapts to different surface curvatures and thicknesses.

Figure 5:
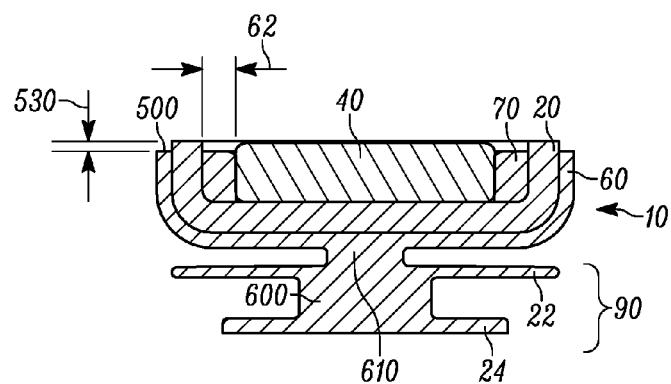
FIG. 5 is a side cut away view of the magnetic fastener clip according to one embodiment.
Figure 6:
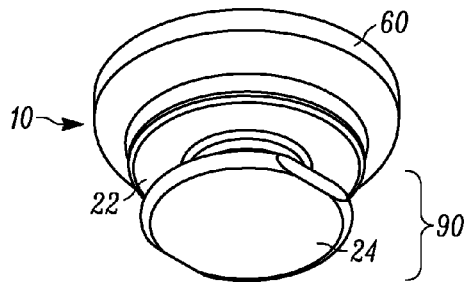
FIG. 6 is a bottom perspective view of the magnetic fastener clip according to one embodiment.
Figure 7:
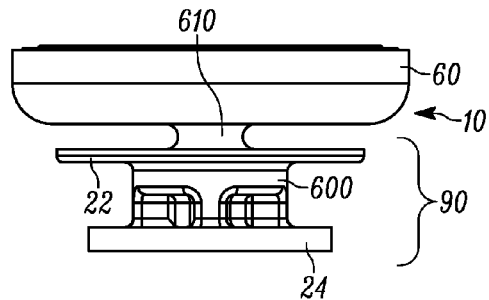
FIG. 7 is a side view of the magnetic fastener clip according to one embodiment.
Figure 8:
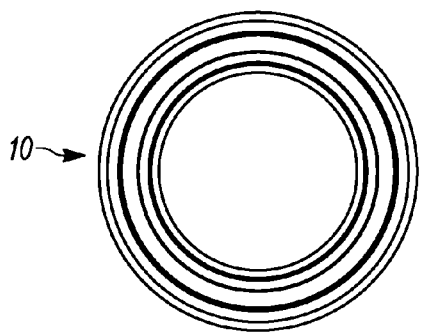
FIG. 8 is a top view of the magnetic fastener clip according to yet another alternative embodiment.

As shown but not limited to FIGS. 5-7, optional coupler 90 may further include inner rib 22 and outer rib 24 connected by a post 600. A boss 610 attaches the ribs 22, 24 with the cup cover 60. Inner rib 22, outer rib 24 and post 600 may be sized to suitably engage a panel mounted tower 110 with a side-slot 200 in a body panel 120 such as a headliner, interior cover, pillar cover, panel over or any object suitable for magnetic fastening to chassis 80.

The ribs 22, 24 may be any suitable shape such as square, oval, round, rectangular or as shown in FIG. 2. The ribs 22, 24 may have any suitable size and relative spacing between ribs 22, 24 via post 600. Alternatively, optional coupler 90 may include any attachment mechanism suitable to couple or attach to a body panel 100, for example as shown on the panel mounted tower 110 such as a nut, bolt, weld stud, thread stud, button head, clip, panel clip, retainer, panel mounted receptacle, retainer washer, or rivet, cable tie, wire clip, hook and loop fastener (Velcro®), sticky tape, double faced tape, glue, spike array, or any suitable combination. The corresponding mounting structure 90 thus would attach to the base attachment mechanism 110 on body panel 120 such as a u-shaped compression flange to engage the post 600 and ribs 22, 24, a bolt-nut, or any suitable fastener pair.

Figure 9:
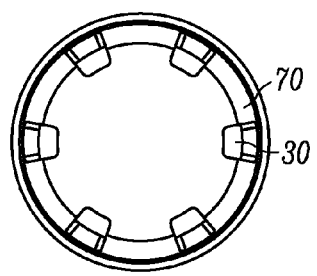
FIG. 9 is a top view of the overmold according to another embodiment.
Figure 10:
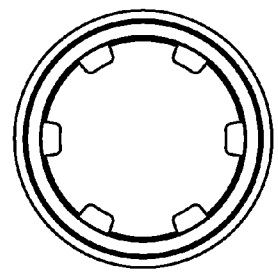
FIG. 10 is a top view of a portion of the overmold and cup according to an embodiment.

As shown in FIGS. 9-10, the overmold 50 may be manufactured by forming the cup cover 60 and the inner ring 70 by injection molding over at least one part of the cup 20 to form the inner ring 70 and the cup cover 60. The inner ring 70 may be formed by temporarily inserting a core pin inside the cup such that as the heated and liquefied plastic is injected, the plastic forms the inner ring 70 and the inside of the cup 20. The core pin diameter may be sized such that the diameter of the inner ring 70 permits the magnet 40 to be suitably press fit into the inner ring 70. For example, the core pin diameter may be sized smaller than the diameter of the magnet 40, such that the magnet 40 may be securely press fit into the cup 20. Accordingly, the plastic molded inner ring 70 may elastically compress between the magnet 40 and the cup 20 to firmly secure the magnet 40 in the cup 20. According to an alternative embodiment, the magnet 40 may be secured to the cup 20 via, glue, pin, screw, nut, rivet, adhesive or any suitable fastener.

As shown in FIG. 5, the thickness of inner ring, the cup 20 may have the gap 62 between the inside of the cup 20 and the magnet 40 sized to maximize magnetic flux lines to flow from the cup side to the chassis 80. In order to maximize the magnetic flux and thus the magnetic force, gap 62 is sized appropriately to permit bending of the magnetic flux from both magnetic poles toward the chassis 80. For example, the inner ring 70 may have a diameter thickness 62 such that the magnetic flux from the cup side 22 of the magnet 40 flows to the metal chassis 80. As a result, the magnetic flux of both sides and both poles of the magnet 40 create magnetic forces attracting the metal chassis 80. The combination of magnetic flux from both sides or poles of the magnet 40 creates a greater magnetic force than from just one side or pole of the magnet 40. Although the gap 62 is formed from the inner ring 70 as shown in the figures, the gap 62 may be air, part plastic and air, glass, rubber or any suitable material or combination. Alternatively, the inner ring 70 and thus the gap 62 may be or include aluminum, titanium, magnesium, or any other suitable metal or material to allow the magnetic flux to flow from the cup side 22 to the metal chassis 80.

According to one embodiment, the inner ring 70 is sized in order to locate the magnet 40 in the cup 20 at a predetermined distance from the inner surface of the cup 20. For example, as the magnet 40 is pressed into the inner ring 70, the inner ring 70 positions and locates the magnet 40 appropriately in order to direct magnetic flux to flow from the cup side 22 to the metal chassis 80 and to securely hold the magnet 40. According to another embodiment, the magnet 40 is removable and reinstallable from the cup 20 to permit servicing for example.

According to one embodiment, the magnet 40 does not contact the magnetic attachment surface 80. Instead, the magnet 40 is positioned at an attachment distance between the magnet 40 and the magnetic attachment surface 80 in order to maximize magnetic flux on the magnet bottom to flow to the top and thus maximize the magnetic attachment force. As shown in FIG. 5, according to one embodiment, the magnet 40 is positioned at a distance 530 from and thus never touches the magnetic attachment surface 80. For example, the magnet 40 may sit sits 0.1 mm below sheet metal or contact surface 80. The distance 530 is may be determined to provide the maximum magnetic flux and thus magnetic force. A distance 530 that is non-zero may provide more magnetic flux than zero.

Figure 11:
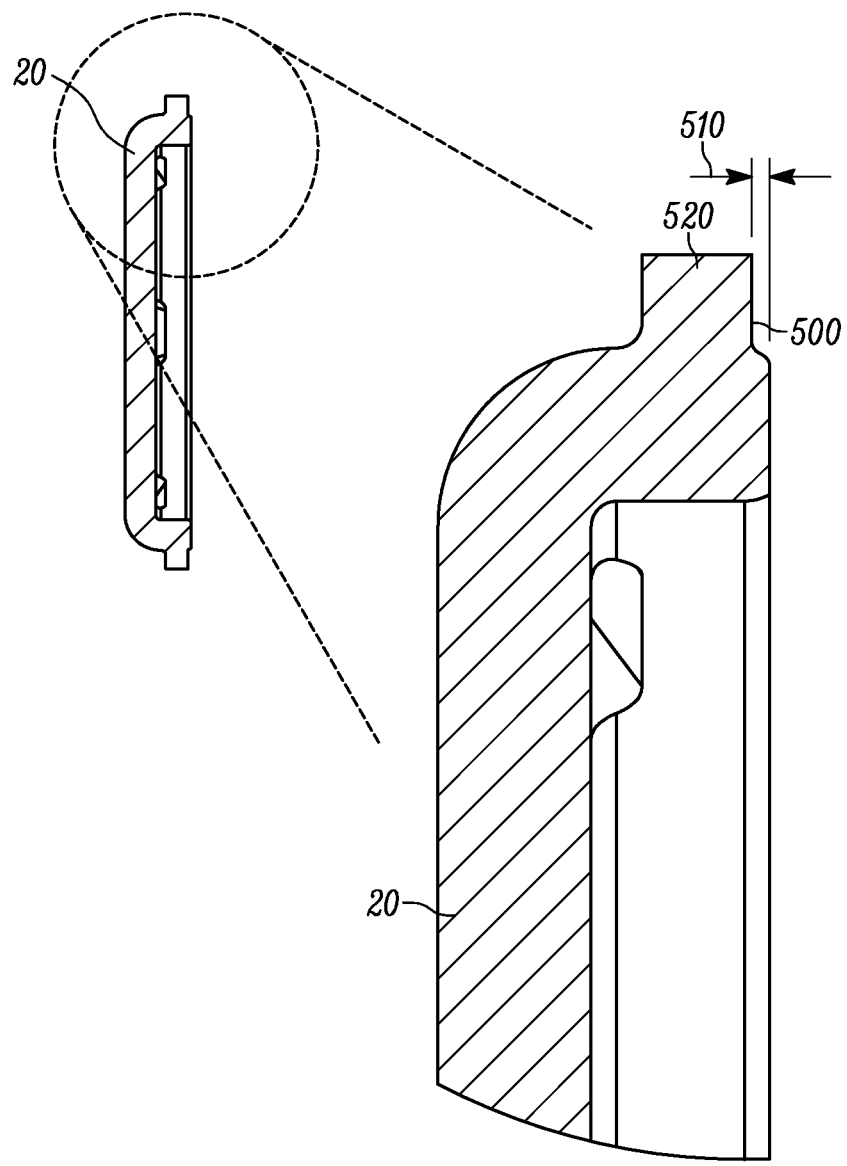
FIG. 11 is an enlarged side view of a portion of the cup according to one embodiment.

As shown in FIGS. 9 and 10, at least one hole 30 allows injection molding of the inner ring 70. For example, melted plastic is injection molded around cup 20 causing melted plastic to flow through holes 30 in cup 20. Holes 30 may be injection holes. Melted plastic flows through holes 30 inside cup 20 and around core pin to form the inner ring 70. The number, diameter, shape and the arrangement of the holes 30 may be selected to suitably permit melted plastic to completely and to thoroughly fill the mold forming inner ring 70 between the cup 20 and the core pin. One, two, three, four, five, six to ten or more holes 30 may be implemented As best shown in FIGS. 5 and 11 according to one embodiment, the cup 20 has a recess 500 and optional ring 520 around an outside perimeter of the cup 20 sized to avoid stamping burrs (not shown) from contacting the magnetic attachment surface 80. For example, the recess 500 and outer ring 520 of cup 20 may be formed by stamping the cup 20 to form the recess 520 a distance 510 below the cup edge. The burr is caused by a force of bending and wrapping sheet metal during stamping of the cup 20. Alternatively, a burr trimmer or lathe may trim the burr or make a top recess 520 on the cup 20 to have a uniform surface. However, the processes of burr trimming or lathe trimming are more process intensive. Rather than the burr trimming or lathe trimming, during stamping of the cup 20, a recess 500 may be formed in the same process that the cup 20 and holes 30 are formed. The recess 500 may be formed so that the magnetic cup lip is flush with the magnetic attachment surface 80. For example, the burr height is typically 4 thousandths of an inch, and thus the height of the recess 500 may be greater than 4 thousandths of an inch, however burr heights vary depending on the size, shape, depth of the cup 20 and the material stamped.

The inner ring 70 and the cup cover 60 may be made of plastic, metal or any suitable material or as described below. Although some examples of the inner ring 70 and the cup cover 60 are described and shown and further described below, including adjustable type fasteners, any suitable material may be employed. By way of example, inner ring 70 attaches to the cup cover 60 as an injection molded piece or alternatively via two pieces by: micro welding, ultrasonic welding (an ultrasonic horn melts the plastic boss in a pre-determine location to attach the inner ring 70 and to the cup cover 60), heat welding, spring finger, screw and pin or any suitable combination thereof.

Although the fastener clip 10 is shown in FIGS. 1-11 with a round magnet 40 any suitable shape may be used including oval, square, rectangular, triangular or polygon.

As shown in FIGS. 2, 6 and 7, the coupler 90 is operative to flex or compress about boss 610 and/or post 600 to permit the fastener clip 10 to pivot. The boss 610 and/or post 600 permits the magnetic fastener 10 to engage a magnetic surface or according to a curvature of an automobile body panel. Any suitable combination of parameters may be sized to permit the desired amount of pivoting, flexing and or compression according for example to the curvature of an automobile body panel such as the roof.

Thus a body panel assembly 100 may include magnetic fasteners 10 of various heights. For example the magnetic fasteners 10 of various heights may be used where the distance between the body panel 120 and chassis 80 varies, such as the headliner and roof.

The magnetic fastener clip 10 may replace one or more conventional fasteners that would be inserted into the hole or slot 200 of the body panel 120. Instead of requiring different conventional fasteners for different size and height requirements, the magnetic fastener 10 may magnetically attach to a chassis 80 or the metal ring surrounding the slot in the body panel and adjust to different size and height requirements.

The coupler 90, ribs 22, 24 may have any suitable size and relative spacing between ribs 22, 24 via post 600 or any suitable combination thereof may be sized to provide the appropriate flexing and spacing between the body panel, such as a headliner and the chassis such as the roof.

FIG. 1 is a perspective view of the body panel assembly 100. The body panel assembly 100 may be pre-assembled by attaching the post 600 of the magnetic fastener clip 10 to a body panel 120 as described above, such as a pillar cover, headliner, or other suitable body panel to form a body panel assembly 100. Alternatively, the coupler 90 according to one embodiment may instead comprise base holes (500 shown in FIG. 5 of co-pending application Ser. No. 12/464,867 incorporated by reference). The base holes (500) permit attachment to the body panel by applying glue or any suitable fastener. Tapered holes that have a larger diameter on the top side of the base (closest to the magnetic fastener 50 than on the bottom side (mating with the body panel) filled with glue will further provide a mechanical connection as well as the chemical connection as a result of the adhesive properties of the glue. The body panel assembly 100 thus comprises a body panel 120 attached to the magnetic fastener clip 10 attached to tower 110 via coupler 90, glue or other suitable fastener such as a screw, bolt, rivet or any suitable fastener to attach the body panel 120 to the magnetic fastener clip 10.

The body panel assembly 100 is operatively inserted as a single unit into a structure, such as a vehicle chassis 80, pillar, roof, instrument panel or frame to form a vehicle with the magnetic clip 10. The magnetic fastener clip 10 adapts to different chassis curvatures such that an angle between the magnetic fastener 10 and the coupler 90 is operative to vary continuously. As previously stated, the coupler 90 may fasten to a body panel, frame or any suitable structure via a suitable fastener.

According to one embodiment, the overmold 50 is injection molded as a single plastic component, thought multiple components may be assembled in one or more injection steps. The angle or inclination, sharpness of cup cover 60 and inner ring 70 may vary depending on the diameter and shape of a slot in the vehicle chassis. Thus it is evident to one skilled in the art that the suitable fastener 10 is shown and described as yet another embodiment to illustrate that the structure for fastening the magnetic fastener 10 is not limited to the examples provided.

According to one embodiment, the cup 20 is made in whole or in part of: magnetic steel or any suitable metal or alternatively of plastic as described below. The tower 110 and body panel 120 may be constructed from plastic or from any suitable material such as plastic, vinyl, cloth, wood, steel, aluminum, magnesium, carbon fiber or any suitable material.

The overmold 50, cup cover 60 and inner ring 70, cup 20 or any combination of components may be made from: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS), or any suitable material and combination thereof.

According to one embodiment, the ribs 22, 24, boss 610 and post 600 are made of rubber, plastic, metal or any material that is flexible enough to support the overmold 50 and allow the magnetic fastener 50 to flex. Ribs 22, 24, boss 610 and post 600 are made from Polypropylene as described in co-pending application Ser. No. 12/464,867 incorporated by reference. Polypropylene or polypropene is normally tough and flexible, especially when copolymerised with ethylene. This allows polypropylene to be used as an engineering plastic, and thus may be used in place of other materials such as ABS, acrylic or certain other plastics. Polypropylene is reasonably economical, and has good resistance to fatigue. Polypropylene has a melting point of ~160° C. (320° F.), as determined by Differential scanning calorimetry (DSC) and thus is suitable for injection molding. Melt processing of polypropylene can be achieved via extrusion and molding. Injection molding may be used to obtain the desired shape.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A magnetic fastener clip comprising:
a cup having at least one hole;
a cup cover attached to an outside portion of the cup;
an inner ring attached to an inside portion of the cup and to the cup cover via the at least one hole; and
a magnet operably attached into the inner ring
wherein the cup cover and the inner ring are injection molded over at least one part of the cup to form the inner ring and the cup cover.

2. The magnetic fastener clip of claim 1 wherein the inner ring locates the magnet in the cup at a predetermined distance from the inner surface of the cup.

3. The magnetic fastener clip of claim 1 wherein the at least one hole allows injection molding of the inner ring.

4. The magnetic fastener clip of claim 1 wherein the cup cover and the inner ring are comprised of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene.

5. The magnetic fastener clip of claim 1 wherein the cup has a recess around an outside perimeter of the cup sized to avoid stamping burrs contacting a magnetic attachment surface.

6. The magnetic fastener clip of claim 1 wherein the magnet does not have a hole.

7. A magnetic fastener clip comprising:
a cup having at least one hole;
a cup cover attached to an outside portion of the cup;
an inner ring attached to an inside portion of the cup and to the cup cover via the at least one hole;
wherein the cup cover and the inner ring are injection molded over
at least one part of the cup to form the inner ring and the cup cover
a magnet operably inserted into the inner ring; and
a coupler attached to the cup cover operative to flex.

8. The magnetic fastener clip of claim 7 wherein the inner ring locates the magnet in the cup at a predetermined distance from the inner surface of the cup.

9. The magnetic fastener clip of claim 7 wherein the at least one hole allows injection molding of the inner ring.

10. The magnetic fastener clip of claim 7 wherein the cup has a recess around an outside perimeter of the cup sized to avoid stamping burrs contacting a magnetic attachment surface.

11. The magnetic fastener clip of claim 7 wherein the magnet does not have a hole.

12. The magnetic fastener clip of claim 7 wherein the inner ring is formed by temporarily inserting a core pin such that injection material forms between an outer portion of the core pin and the cup.

13. The magnetic fastener clip of claim 7 wherein the cup cover and the inner ring are comprised of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS).

14. The magnetic fastener clip of claim 7 wherein the inner ring is sufficiently flexible to permit the magnet to be press fit into the inner ring.

15. The magnetic fastener clip of claim 7 wherein a magnetic cup lip is flush with a magnetic attachment surface.

16. A vehicle and magnetic fastener clip comprising:
a vehicle chassis having a magnetic attachment surface;
a magnetic fastener clip comprising:
a cup having at least one hole;
a cup cover attached to an outside portion of the cup;
an inner ring attached to an inside portion of the cup and to the cup cover via the at least one hole;
wherein the cup cover and the inner ring are injection molded over at least one part of the cup to form the inner ring and the cup cover,
a magnet operably inserted into the inner ring; and
a coupler attached to the cup cover operative to flex.

17. The vehicle and magnetic clip of claim 16 wherein the cup has a recess around an outside perimeter of the cup sized to avoid stamping burrs contacting the magnetic attachment surface.

18. The vehicle and magnetic clip of claim 16 wherein the cup has a height to form a gap between the magnet and the magnetic attachment surface.

* * * * *